Jan. 21, 1941.  G. FASSIN  2,229,284

PHOTOGRAPHIC ENLARGER

Filed March 22, 1939  3 Sheets-Sheet 1

Gustave Fassin
INVENTOR

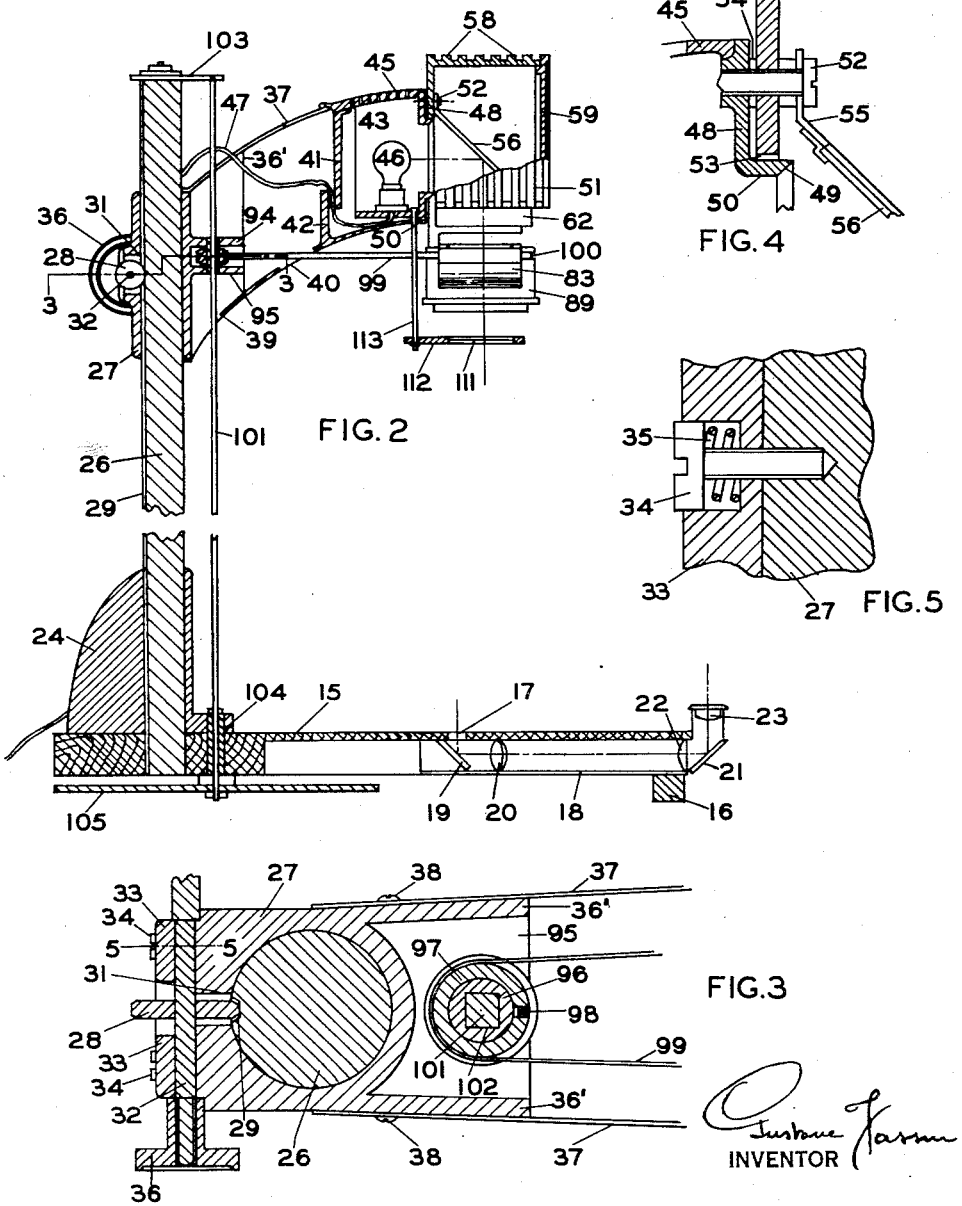

Jan. 21, 1941.  G. FASSIN  2,229,284
PHOTOGRAPHIC ENLARGER
Filed March 22, 1939   3 Sheets-Sheet 3

Gustave Fassin
INVENTOR

Patented Jan. 21, 1941

2,229,284

UNITED STATES PATENT OFFICE 2,229,284

PHOTOGRAPHIC ENLARGER

Gustave Fassin, Grosse Pointe, Mich., assignor to International Industries, Inc., Ann Arbor, Mich., a corporation of Michigan Application March 22, 1939, Serial No. 263,397

8 Claims. (Cl. 88—24)

The present invention relates to optical projection apparatus for photographic enlarging.

One of the objects of the present invention is to provide a simple, efficient and accurate photographic enlarger. Another object is to provide a photographic enlarger which may be readily brought into exact focus. A further object is to provide a remote control focussing mechanism for a photographic enlarger. Still another object is to provide a photographic enlarger having a focussing microscope on the easel and a focus control mechanism adjacent the microscope. These and other objects and advantages reside in certain novel features of construction, arrangement and combination of parts as will hereinafter be more fully set forth and pointed out in the appended claims.

Referring to the drawings:

Fig. 2 is a vertical section thereof.

Fig. 3 is a section taken on line 3—3 of Fig. 2.

Fig. 4 is an enlarged fragmentary section showing the connection between the lamp and reflector housings.

Fig. 5 is a section taken on line 5—5 of Fig. 3.

Figure 1:
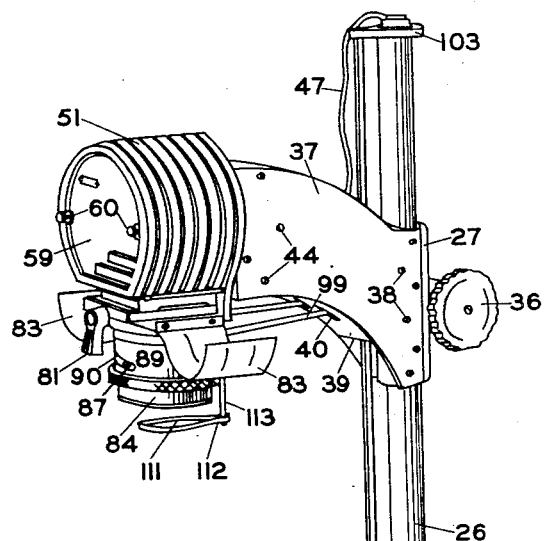
Fig. 1 is a perspective view of my new photographic enlarger.

A preferred form of my invention is illustrated in the drawings wherein 15 designates a flat board or easel supported on three or more spaced feet 16. This easel 15 may be similar to the easel described and claimed in my copending application Serial No. 258,665 filed Feb. 27, 1939, for Photographic printing easel.

The easel 15 has a central aperture 17 beneath which is secured a tube 18 containing a reflector 19 for directing light from the aperture 17 horizontally through a microscope objective 20. A second reflector 21 directs the light upward beyond the edge of the board 15 and the image formed by the objective 20 is observed by means of an ocular consisting of the lenses 22 and 23. I prefer to make this microscope of such power that the silver grains on the film are resolved and thus the enlarged image may be focussed with a high degree of accuracy. In focussing, a target is used and this target occupies the exact plane of the sensitive surface of a photographic printing paper.

A bracket 24 is suitably fixed on the easel 15 by screws or bolts 25 and a vertical column 26 is secured in the bracket 24. A carriage 27 is slidably mounted on the column 26. The carriage 27 is raised and lowered by means of a wheel 28 which engages in a groove 29 formed in the column 26. Preferably both the wheel 28 and groove 29 are tapered and knurled to insure positive engagement.

The wheel 28 is fixed on a shaft 32 and extends through a vertical slot 31 in the carriage 26. Two bearing straps 33 fastened to the carriage 26 by bolts 34 hold the shaft 32 in horizontal position. These straps 33 are pressed against the shaft 32 by springs 35 and thus the wheel 28 is pressed firmly into the groove 29. Two knobs 36 secured on the ends of the shaft 32 serve to rotate the shaft and raise or lower the carriage 27 on the column 26. The friction between the column 26 and the wheel 28 and carriage 27 holds the carriage in adjusted position on the column.

The carriage 27 is formed with two vertical side fins 36' to which a hollow housing 37 is suitably attached as, for example, by screws or bolts 38. This housing 37 extends forwardly over the board or easel 15 and is formed with openings 39 and 40 in its lower wall. Forwardly of these openings 39 and 40, the housing 37 has two internal baffle walls 41 and 42 which permit the free passage of air but act as a light trap.

A lamp casing 43 is suitably fastened in the open front end of the housing 37 by screws or bolts 44 and the top of the lamp casing 43 is closed by a door 45 pivotally secured on the housing 37. The door 45 is formed with a plurality of openings to permit the escape of heat as is well known in the art. A light source 46 is suitably secured in the lamp chamber 43 and is supplied with current through a wire or cable 47.

The front wall 48 of the lamp chamber 43 has a forwardly extending flange 49 surrounding a central aperture 50. A reflector housing 51 is attached to the wall 48 of the lamp chamber 43 by a plurality of bolts 52. This reflector housing has a central opening 53 larger than the flange 48 and is held in spaced relation to the lamp chamber 43 by non-conducting washers 54. Thus the reflector housing is insulated from the lamp chamber and the flange 49 serves as a baffle or trap to prevent the passage of stray light from the lamp chamber 43 to the easel 15.

A bracket or frame 55, secured at one end to a bolt 52 and at the other to the floor or bottom of the housing 51, carries a reflector 56 which receives light from the lamp 46, and directs it downward through an aperture 57 in the bottom of the housing 51. This reflector 56 is preferably formed of a heat conducting material such as metal, and its rear surface is preferably black to increase the radiation from the reflector to the walls of the housing 51. The housing 51 is, in turn, provided with a series of radiating fins or ribs 58. The front wall 59 of the housing 51 is removably attached in position by screws 60.

Directly beneath the reflector 56 and above the aperture 57, the housing 51 has a cylindrical portion 62 within which, a lens cell 63, carrying condensing lenses 64, is slidably mounted. This cell 63 is moved vertically in the portion 62 until the light from the lamp 46 is focussed on the film and is then locked in position by a set screw 65.

Figure 7:
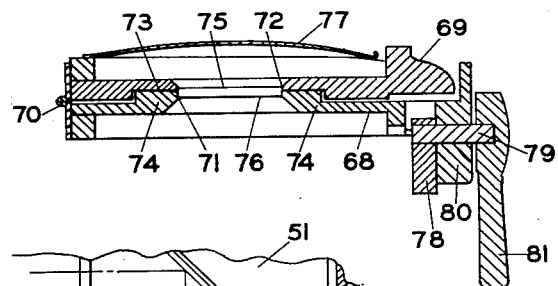
Fig. 7 is a vertical section of the film gate.
Figure 6:
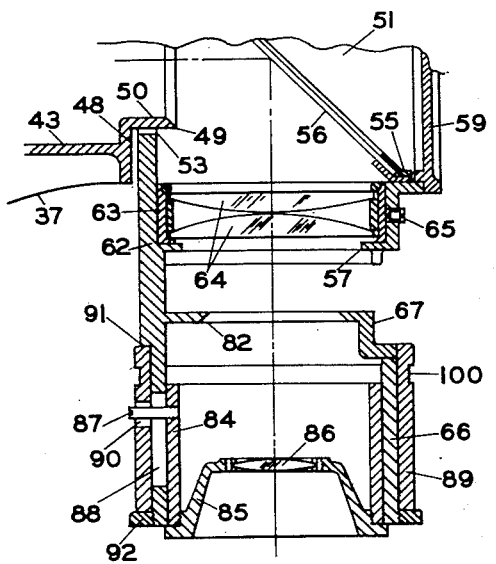
Fig. 6 is an enlarged fragmentary section of the projector optical system.
Figure 8:
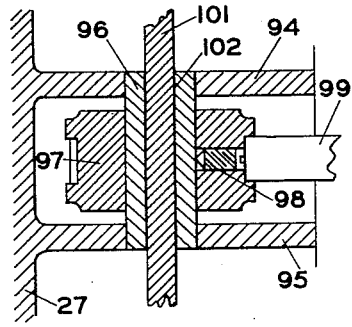
Fig. 8 is an enlarged vertical section of the focussing pulley.

Beneath the aperture 57, and in spaced relation to the bottom wall, the housing 51 carries a sleeve 66 which may be formed integrally with the housing. The sleeve 66 has a flat plate 67 at its upper end and this plate 67 is formed with an aperture 82. The film gate shown in Fig. 7 is removably positioned between the plate 67 and the bottom wall of the housing 51. The film gate consists of a bottom plate 68 and a top plate 69 pivotally secured together along one edge by a hinge 70. The two plates 68 and 69 are formed with alined central apertures 71 and 72 respectively, of the same size as the picture portion of the film to be enlarged. The upper plate 69 has a longitudinal recess 73 of the same width as the film, and the lower plate 68 has projections 74 which engage the edges of the film and hold the film flat in the recess 73 across the apertures 71 and 72. The two plates 69 and 68 have longitudinal grooves 75 and 76 respectively, of the width of the picture portion of the film so that the film may be drawn between the plates 68 and 69 without scratching the picture portion.

A leaf spring 77, fixed on the top plate 69, bears against the bottom of the housing 51 and presses the plates 68 and 69 together. In order to release this pressure, a cam 78 is fixed on a stub shaft 79 journalled in a projection 80 on the plate 68. This shaft 79 may be rotated by a handle 81 to move the cam 78 into contact with a portion of the plate 69 to raise the top plate 69 against the pressure of the spring 77. Two aprons 83 suitably secured one on each side of the sleeve 66 hold any excess film.

A sleeve 84 is vertically slidable in the sleeve 66 beneath the aperture 82 and a lens cell 85, carrying an objective 86, is threaded in the bottom end of the sleeve 84. A pin 87 is fixed in the wall of the sleeve 84 and projects laterally through a vertical slot 88 in the sleeve 66. In order to move the pin 87, sleeve 84 and objective 86 vertically for focussing, a third sleeve 89, having a helical cam slot 90 engaging the pin 87, is rotatably mounted on the outside of the sleeve 66. The top of the sleeve 89 abuts against a shoulder 91 on the sleeve 66 and is held against this shoulder by a collar 92 threaded on the bottom of the sleeve 66. The sleeve 89 is thus free to rotate but is held against axial movement on the sleeve 66.

Between the fins 36', the carriage 27 is provided with two spaced horizontal ribs 94 and 95. A bushing 96 is rotatably journalled in these two ribs 94 and 95 and a pulley 97 is secured on the bushing 96 between the ribs by a a set screw 98. A belt 99, which may consist of a flat steel strip, passes over the pulley 97, through the openings 40 and engages in an annular groove 100 in the sleeve 89. Thus rotation of the pulley 97 causes rotation of the sleeve 89 and longitudinal focussing movement of the lens 86.

In order to rotate the pulley 97, a square rod 101 passes vertically through the housing 37 and through a square central bore 102 in the bushing 96. The top of this rod 101 is journalled in a cap 103 fixed on top of the column 26 and the bottom of the rod 101 is fastened in a bushing 104 rotatably mounted in the easel 15. A large wheel 105 is fixed on the bottom of the rod 101 beneath the easel 15 for rotating the rod to focus the lens 86.

Figure 9:
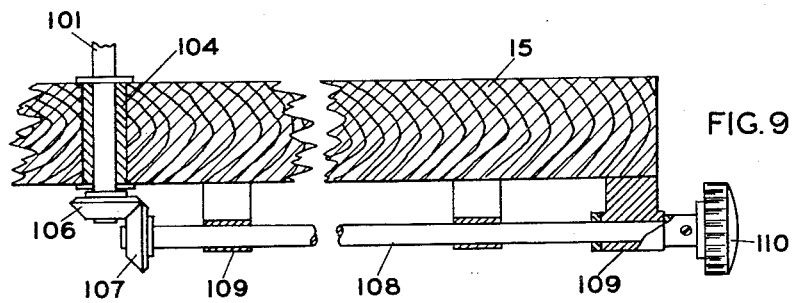
Fig. 9 is a vertical section of a modified form of focus control mechanism.

In the modification shown in Fig. 9, a bevel gear 106 is attached on the bottom of the rod 101 and is engaged by a second bevel gear 107 mounted on a horizontal shaft 108. This shaft 108 is rotatably mounted in brackets 109 beneath the easel 15 and extends under the easel to a point adjacent the eyepiece of the microscope. A knob 110 on the end of the shaft 108 serves to rotate this shaft.

The operation of my improved photographic enlarger is as follows. The operator places a film in the film gate and then places the film gate in the enlarger. The film gate is opened by means of the handle 81 and cam 78 to relieve the tension on the film and the film is moved back and forth to select the picture to be enlarged.

The entire projector is then raised or lowered on the column 26 by means of the knobs 36 until the desired amount of enlargement is obtained. During this movement, the rod 101 slides freely in the bore 102 of the bushing 96. The operator then places his eye at the eyepiece of the microscope and rotates the wheel 105 or knob 106 until the enlarged image of the film is in exact focus at the plane of the printing paper. The operator can then proceed to make his prints in the usual manner.

The usual filter 111 is mounted in a frame 112 secured on a shaft 113. This shaft 113 is rotatably secured in the housing 37 and lamp chamber 43 so that the filter 111 may be swung into or out of the image forming light beam from the projector. The filter 111 is of a color to which the enlarging paper is not sensitive so that with the filter 111 in place in the beam, the paper can be positioned with respect to the image without fogging.

From the foregoing, it will be apparent that I am able to attain the objects of my invention and provide a photographic enlarger having a simple, yet convenient and effective means for insuring accurate focus. While I have illustrated my enlarger as having a focussing microscope built into the easel, it is obvious that the microscope could be an accessory on the easel. The focus control mechanism would be equally effective and convenient with either type. Various modifications of structure and arrangement of the parts and elements can, of course, be made without departing from the spirit of my invention or the scope of the appended claims.

I claim:

1. A photographic enlarger comprising a base having a flat surface for receiving a sheet of photo-sensitive material, a substantially vertical column mounted on said base at one side of said surface, a carriage slidably mounted on said column, means for sliding said carriage on said column, a pulley rotatably carried by said carriage, said pulley having a non-circular opening therethrough, a non-circular, vertical shaft rotatably carried by said base and extending upward through the opening in said pulley for rotating said pulley, a housing secured at one end to said carriage and extending forwardly over said surface, a lamp chamber secured in the forward end of said housing, a reflector housing carried by said lamp chamber, a reflector within said reflector housing for directing light from said lamp chamber to said surface, an object support carried by said reflector housing beneath said reflector and in the path of the directed light, an objective adjustably carried by said reflector housing beneath said object support, means for adjusting said objective toward and from said object support to focus an image of an object on said support on said surface, and means operatively interconnecting said pulley with the last named means whereby rotation of said shaft adjusts said objective for focussing.

2. A photographic enlarger comprising a hollow base, a flat photo-sensitive sheet support carried by said base, said support having an aperture therethrough, means within said base for receiving light from said aperture and directing it in a direction parallel to said support, an objective mounted within said base in the path of the directed light and positioned so that its object plane coincides with the plane of a photo-sensitive sheet on said support, an ocular carried by said base and extending beyond said support for receiving the image formed by said objective, an upright column carried by said support, a projector carried by said column, a projection lens adjustably mounted on said projector for projecting an image onto said support, a rotary sleeve for adjusting said lens for focussing, a vertical shaft rotatably carried by said base, means for operatively interconnecting said shaft and said sleeve whereby rotation of said shaft actuates said sleeve, and means carried by said base adjacent said ocular and operatively connected to said shaft for rotating said shaft.

3. A photographic enlarger comprising a base having a flat surface for receiving a photo-sensitive sheet, a substantially vertical column carried by said base, a carriage vertically slidably mounted on said column, means for sliding said carriage, a pulley rotatably mounted on said carriage, said pulley having a non-circular aperture therethrough, a vertical, non-circular rod rotatably carried by said base adjacent said column and slidably engaging in said aperture to actuate said pulley, means for actuating said rod, a projector mounted on said carriage and extending over said surface, an objective lens adjustably mounted on said projector for projecting images on said surface, a sleeve rotatably mounted on said projector and operatively connected to said objective for adjusting said objective to focus said images, and means for transmitting rotary motion from said pulley to said sleeve.

4. A photographic enlarger comprising a base having a flat surface for receiving a photo-sensitive sheet, said surface having an aperture therethrough, means positioned within said base for deflecting light from said aperture in a direction parallel to said surface, a microscope mounted within said base in the path of the deflected light, the object plane of said microscope being co-incident with the plane of a photo-sensitive sheet on said surface and the eyepoint of the microscope being adjacent an edge of said surface, an upright column mounted on said base, an image projector carried by said column above said surface, a lens adjustably mounted on said projector, actuating means for adjusting said lens to focus an image on said surface, and means carried by said base adjacent said microscope, and operatively connected to said actuating means for driving said actuating means to focus said lens.

5. A photographic enlarger comprising a substantially flat easel, an upright column mounted on said easel, a carriage vertically adjustably mounted on said column, means for adjusting said carriage, a projector mounted on said carriage and extending outward over said easel, an objective lens vertically adjustably mounted on said projector for focussing a projected image on said easel, a member rotatably mounted on said projector for adjusting said lens, a pulley rotatably mounted on said carriage, said pulley having a non-circular bore therethrough, a vertical, non-circular rod rotatably carried by said easel and slidably engaging in said bore, means for transmitting rotary motion from said pulley to said member, and means adjacent an edge of said easel for actuating said rod.

6. A photographic enlarger comprising an easel, a vertical column mounted on said easel, a carriage vertically slidably mounted on said column, a tubular housing secured at one end to said carriage and extending forwardly therefrom over said easel, a lamp chamber secured in the other end of said housing, a vertical wall having an aperture therein forming one side of said lamp chamber, a reflector housing secured to said wall, means for insulating said reflector housing from said lamp chamber, said reflector housing having a first opening in alinement with the aperture in said wall and a second opening facing said easel, a reflector mounted in said reflector housing facing said openings for receiving light from said first opening and directing it through the second opening toward said easel, an objective lens mount carried by said reflector housing beneath said second opening and in spaced relation thereto, an objective lens adjustably secured in said mount, a film gate removably mounted in the space between the second opening and the lens mount, and means for adjusting said lens to focus an image of a film in said film gate on said easel.

7. A photographic enlarger comprising a base, a column rigidly secured on said base, a projection apparatus slidably mounted on said column for movement toward and from said base, an objective lens adjustably mounted in said projection apparatus, actuating means for adjusting said objective lens for focusing, a flat support carried by said base in alignment with said objective lens for receiving a photosensitive sheet, said surface having an aperture therethrough, a microscope carried by said base beneath said surface, said microscope being fixed with its object plane coincident with the plane of a photosensitive sheet on said surface and its eyepoint adjacent the edge of the surface, adjusting means carried by said base adjacent said surface and means for operatively interconnecting said adjusting mechanism and said actuating means whereby operation of said mechanism adjusts said lens.

8. An enlarging projector comprising a lamp housing having a front wall, a source of light mounted therein, said lamp housing having an opening in said front wall in alignment with said source, a flange on said front wall surrounding said opening and projecting outwardly therefrom, a reflector housing having an aperture therein larger than said flange, means for securing said reflector housing to the front wall of said lamp housing in spaced relation thereto and with said flange extending into said reflector housing through said aperture, a light deflector mounted within said reflector housing in alignment with said aperture for receiving light from said source and directing it downward at an angle, means on said light deflector for radiating heat to the reflector housing, the interior of said reflector housing being heat absorbing, heat dissipating means on the outside of said reflector housing, said reflector housing having a second aperture beneath and in alignment with said light deflector, means carried by said reflector housing for supporting an object to be projected beneath and in alignment with said second aperture, and an objective lens carried by said reflector housing in alignment with said object supporting means.

GUSTAVE FASSIN.